(12) United States Patent
Turgeon

(10) Patent No.: US 6,973,976 B1
(45) Date of Patent: Dec. 13, 2005

(54) SELF-ALIGNING AND SELF-LOCKING HITCH ASSEMBLY

(76) Inventor: Marc Turgeon, 7956 CH. Turgeon, Disraélie (CA) G0N 1E0

( * ) Notice: Subject to any disclaimer, the term of this patent is extended or adjusted under 35 U.S.C. 154(b) by 0 days.

(21) Appl. No.: 10/862,176

(22) Filed: Jun. 7, 2004

(51) Int. Cl.$^7$ .......................... A01B 59/00; B62C 7/00; B62C 11/00
(52) U.S. Cl. ...................................... 172/677; 280/186
(58) Field of Search .............................. 172/677–681, 172/683, 439, 443, 446–451; 280/186, 477, 280/478.1, 504

(56) References Cited

U.S. PATENT DOCUMENTS

| | | | |
|---|---|---|---|
| 4,844,497 A | * | 7/1989 | Allen ........................ 280/477 |
| 5,549,316 A | * | 8/1996 | Jones ........................ 280/477 |

* cited by examiner

Primary Examiner—Christopher J. Novosad

(57) ABSTRACT

A hitch assembly including a triangular flat portion mounted on the base plate of a guidable member for connecting an arm to the triangular flat portion and to a housing mounted above a plate on which is mounted a tube section having a reinforcing plate that is connected to a locking member which automatically closes on a locking pin being mounted to a coupler head by means of a tension spring that applies a pressure against a block being engaged on a threaded bolt with eye mounted inside the tube section, and which for disengaging the locking member from the locking pin one pulls backwards an attachment cord connected with the eye of the threaded bolt.

A tube section mounted underneath the coupler head allows to receive each spring blade being held together by an attachment member. A spring blade includes a part member for enabling to apply a pressure against a squared plate portion mounted underneath each tow bar connected to the coupler head for raising the tow bars of the agricultural implement.

8 Claims, 5 Drawing Sheets

SELF-ALIGNING AND SELF-LOCKING HITCH ASSEMBLY

BACKGROUND OF THE INVENTION

1. Field of the Invention

This invention relates to a hitch assembly for attaching agricultural implements to a tractor and more particularly, it relates to hitches which automatically align the agricultural implement into the hitch that automatically closing on the coupling element of the tractor.

2. Description of the Related Art

A search of prior art records has unveiled the following patents:
1. CA 2,437,842 registered in 2003 to Champagne;
2. U.S. Pat. No. 4,792,151 issued in 1988 to Feld;
3. U.S. Pat. No. 5,549,316 issued in 1996 to Jones;
4. JP 2002 017 109 published in 2002 to Satoshi;
5. AU 511,221 issued in 1980 to Kempers;
6. U.S. Pat. No. 4,844,497 issued in 1989 to Allen;
7. GB 735,563 issued in 1955 to Chambers;
8. GB 937,035 issued in 1963 to House; and
9. U.S. 2003 178 810 published in 2003 to Kovash.

SUMMARY OF THE INVENTION

It is a principal object of this invention therefore to provide a hitch assembly which is readily adapted to use for attaching agricultural implements to a tractor.

More specifically a hitch assembly in accordance with the present invention, there is provided with a guidable member having a base plate interconnected to two triangular plates, which a triangular flat portion being formed with hinges is mounted thereon the base plate for connecting at its upper portion therewith one end of an arm being engaged between each hinge, and which a connecting pin having hole passes through the hinges to be fixed thereby a cotter pin into hole of the connecting pin.

A T hinge formed at one end of a housing is engaged between each hinge being formed at the lower portion of the triangular flat portion, and which a connecting pin having hole passes through the hinges to be fixed thereby a cotter pin into hole of the connecting pin.

A connecting pin having hole being formed thereon the housing is engaged through a hole formed at one end of the arm and fixed thereby a cotter pin into hole of the connecting pin.

A threaded bolt with eye passes through a hole of a bushing and a tube section having a reinforcing plate which is fixed to a plate and to a locking member that is pivotally mounted above a vertical pivot pin having hole and being formed thereon the plate, and which the locking member is locked on the pivot pin thereby a washer and a cotter pin into hole of the pivot pin. A tension spring and a block having hole are mounted thereon the threaded bolt and inside the tube section. A nut threaded onto the bolt is tightened against the block.

An attachment cord mounted with the eye of the threaded bolt turns around a pulley that is fixed into a hole being formed thereon the plate by a threaded bolt and connected thereby a locking nut.

A recess being formed at one end of the plate allows to receive the coupling element of the tractor (not shown). A tube section having holes is mounted underneath the plate for receiving the towing hitch of the tractor (not shown) to be fixed by each threaded bolt therein holes and connected by each adjustment and locking nut.

A squared plate portion is fixed underneath each tow bar of an agricultural implement which are connected at one end of a coupler head by a threaded bolt and locking nut. At the other end of the coupler head a locking pin passes through vertically aligned holes to allow to be engaged with a recess being formed at one end of the plate and to be locked when the tension spring applies a pressure against the block for automatically closing the locking member thereon the locking pin, and which for disengaging the locking member from the locking pin one pulls backwards the attachment cord.

A tube section having holes is fixed underneath the coupler head by each threaded bolt and locking nut for receiving each spring blade which are held together thereby an attachment member. A spring blade includes a part member for enabling to apply a pressure against the squared plate portion for raising the tow bars of the agricultural implement (not shown).

Figure 1:
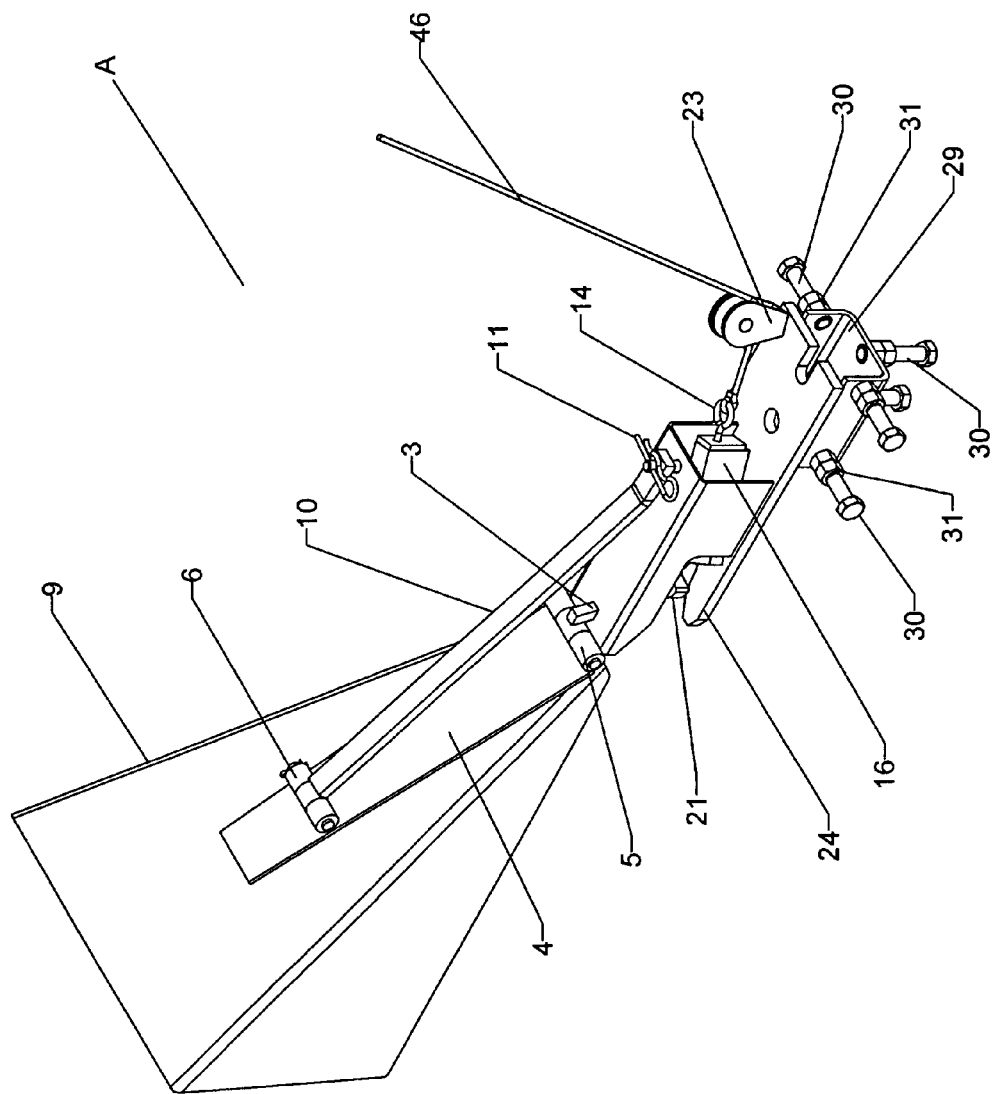
FIG. 1 is a perspective view of a self-aligning and self-locking hitch assembly for attaching agricultural implements to a tractor.

The following parts of the illustrative hitch assembly may be found in the figures:

A: Hitch assembly
1: Housing
2: Connecting pin
3: T hinge
4: Triangular flat portion
5: Hinge
6: Hinge
7: Connecting pin
8: Cotter pin
9: Guidable member
10: Arm
11: Cotter pin
12: Connecting pin
13: Cotter pin
14: Bolt with eye
15: Bushing
16: Tube section
17: Tension spring
18: Block
19: Locking nut
20: Washer
21: Locking member.
22: Reinforcing plate
23: Pulley
24: Plate
25: Pivot pin
26: Cotter pin 27: Threaded bolt
28: Locking nut
29: Tube section
30: Threaded bolt
31: Adjustment and locking nut
32: Coupler head
33: Locking pin
34: Threaded bolt
35: Locking nut
36: Tow bar
37: Tube section
38: Threaded bolt
39: Locking nut
40: Attachment member
41: Spring blade
42: Spring blade
43: Spring blade
44: Part member
45: Squared plate portion
46: Attachment cord

DESCRIPTION OF THE PREFERRED EMBODIMENT

Figure 2A:
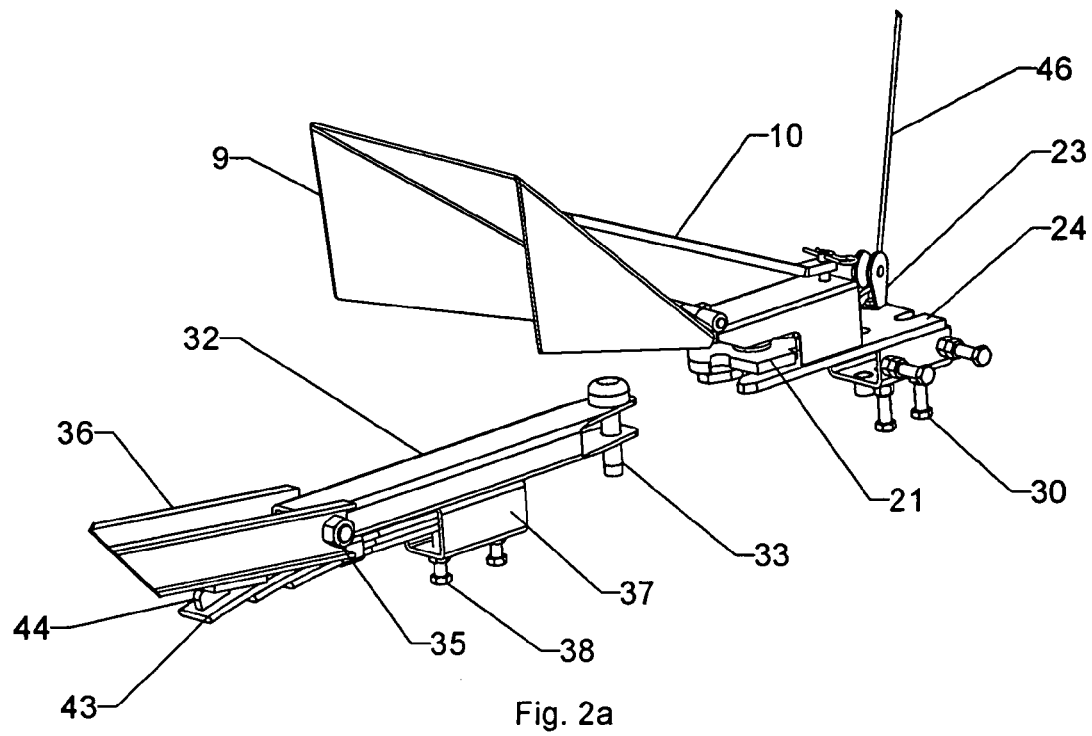
FIG. 2a is a perspective view of the self-aligning and self-locking hitch assembly disengaged of the coupler head connected to each tow bar of the agricultural implement.
Figure 2B:
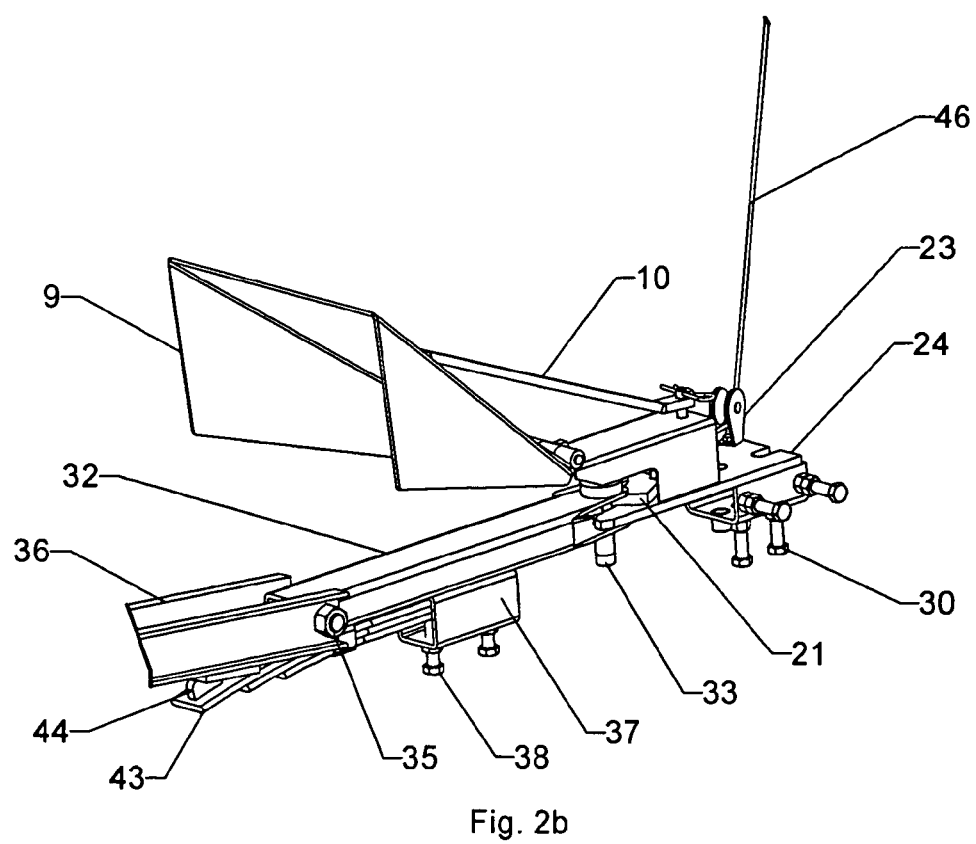
FIG. 2b is a perspective view of the self-aligning and self-locking hitch assembly engaged to the coupler head connected to each tow bar of the agricultural implement.
Figure 3A:
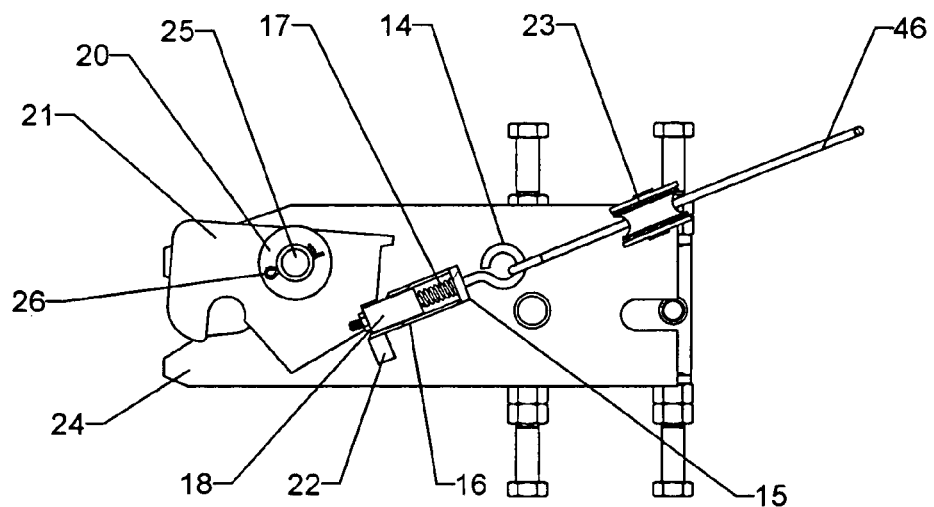
FIG. 3a is a side elevational view showing the locking member in the closed position.
Figure 3B:
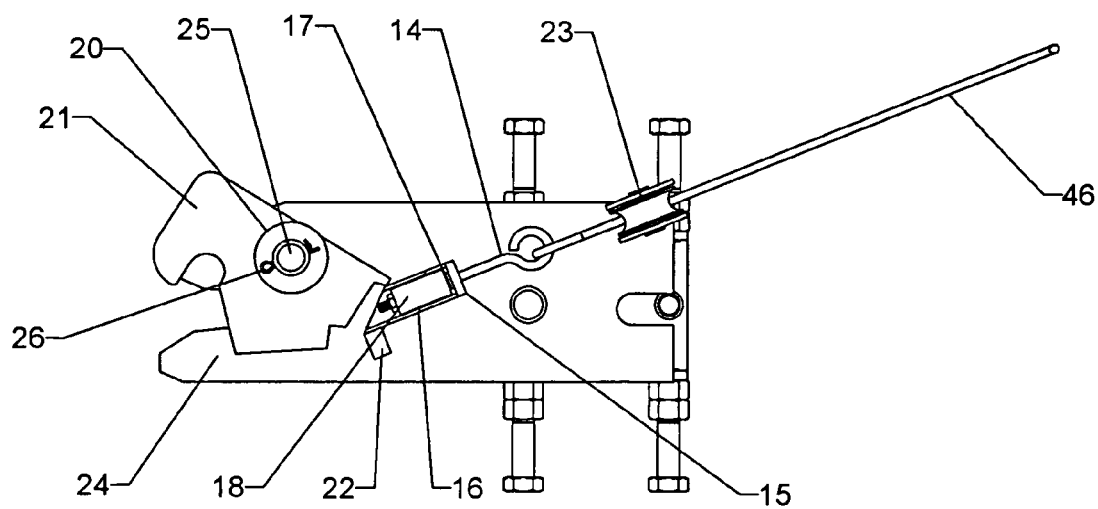
FIG. 3b is a side elevational view showing the locking member in the open position.
Figure 4:
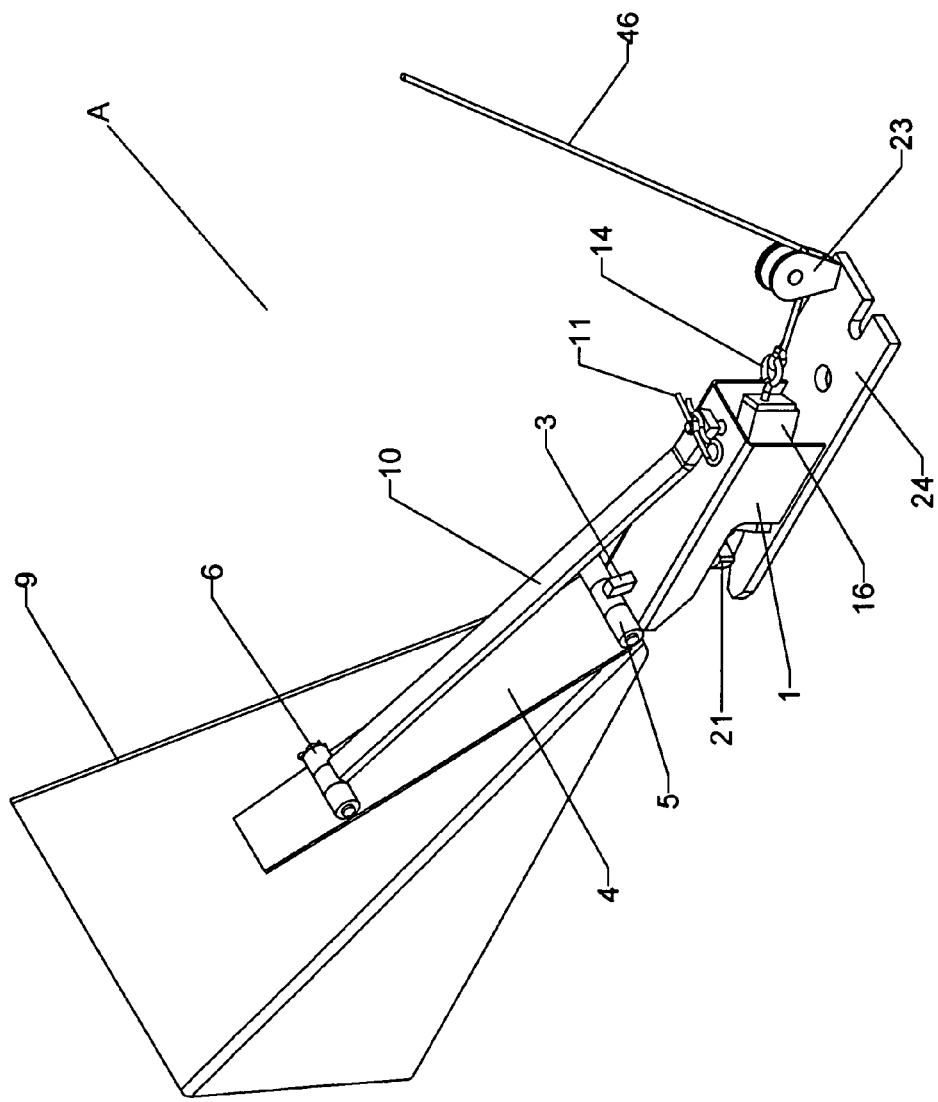
FIG. 4 is a perspective view of the hitch assembly.
Figure 5:
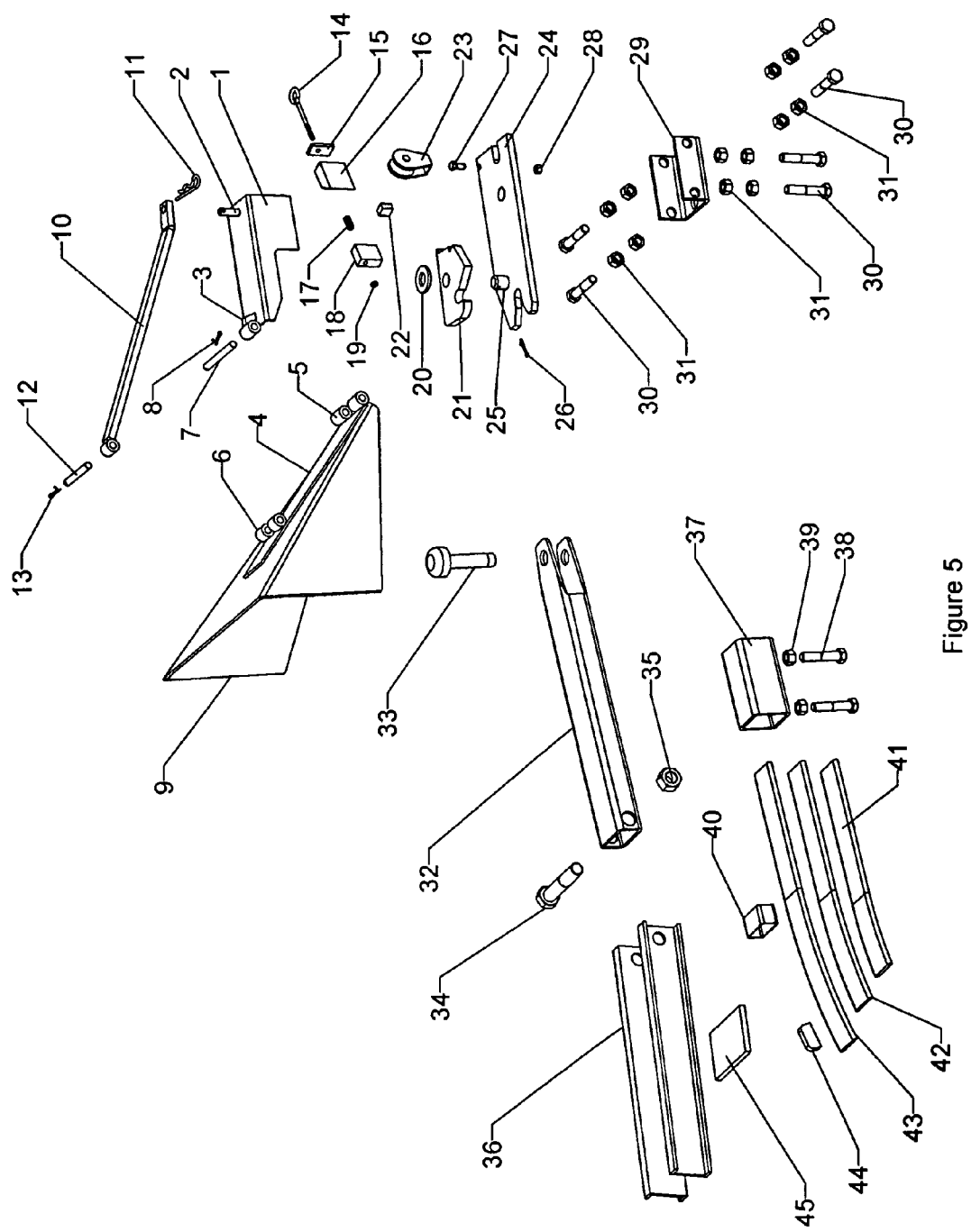
FIG. 5 is an exploded view showing the components in position for assembly.

Referring to the drawings, and more particularly to FIGS. 1 to 5, a hitch assembly (A) for attaching agricultural implements to a tractor including a guidable member (9) having a base plate interconnected to two triangular plates, which a triangular flat portion (4) being formed with hinges (5) and (6) is mounted thereon the base plate for connecting at its upper portion therewith one end of an arm (10) being engaged between each hinge (6), and which a connecting pin (12) having hole passes through the hinges (6) to be fixed thereby a cotter pin (13) into hole of the connecting pin (12).

A T hinge (3) formed at one end of a housing (1) is engaged between each hinge (5) being formed at the lower portion of the triangular flat portion (4), and which a connecting pin (7) having hole passes through the hinges (5) to be fixed thereby a cotter pin (8) into hole of the connecting pin (7).

A connecting pin (2) having hole being formed thereon the housing (1) is engaged through a hole formed at one end of the arm (10) and fixed thereby a cotter pin (11) into hole of the connecting pin (2).

A threaded bolt (14) with eye passes through a hole of a bushing (15) and a tube section (16) having a reinforcing plate (22) which is fixed to a plate (24) and to a locking member (21) that is pivotally mounted above a vertical pivot pin (25) having hole and being formed thereon the plate (24), and which the locking member (21) is locked on the pivot pin (25) thereby a washer (20) and a cotter pin (26) into hole of the pivot pin (25). A tension spring (17) and a block (18) having hole are mounted thereon the threaded bolt and inside the tube section (16). A nut (19) threaded onto the bolt (14) is tightened against the block (18).

An attachment cord (46) mounted with the eye of the threaded bolt (14) turns around a pulley (23) that is fixed into a hole being formed thereon the plate (24) by a threaded bolt (27) and connected thereby a locking nut (28).

A recess being formed at one end of the plate (24) allows to receive the coupling element of the tractor (not shown). A tube section (29) having holes is mounted underneath the plate (24) for receiving the towing hitch of the tractor (not shown) to be fixed by each threaded bolt (30) therein holes and connected by each adjustment and locking nut (31).

A squared plate portion (45) is fixed underneath each tow bar (36) of an agricultural implement which are connected at one end of a coupler head (32) by a threaded bolt (34) and locking nut (35). At the other end of the coupler head (32) a locking pin (33) passes through vertically aligned holes to be engaged with a recess being formed at one end of the plate (24) and to be locked when the tension spring (17) applies a pressure against the block (18) for automatically closing the locking member (21) thereon the locking pin (33), and which for disengaging the locking member (21) from the locking pin (33) one pulls backwards the attachment cord (46).

A tube section (37) having holes is fixed underneath the coupler head (32) by each threaded bolt (38) and locking nut (39) for receiving each spring blade (41)(42)(43) which are held together thereby an attachment member (40). The spring blade (43) includes a part member (44) for enabling to apply a pressure against the squared plate portion (45) for raising the tow bars (36) of the agricultural implement (not shown).

Although only a single embodiment of the present invention has been described and illustrated, the present invention is not limited to the features of this embodiment, but includes all variations and modifications within the scope of claims.

I claim:

1. A hitch assembly comprising:
   a guidable member (9) having a base plate interconnected to two triangular plates,
   means for connecting the guidable member (9) to a housing (1) mounted above a plate (24) comprising:
   a triangular flat portion (4) being formed with hinges (5) and (6) is mounted thereon the base plate for connecting at its upper portion therewith one end of an arm (10) being engaged between each hinge (6), and which a connecting pin (12) having a hole passes through the hinges (6) to be fixed thereby a cotter pin (13) into the hole of said connecting pin (12),
   a T hinge (3) formed at one end of a housing (1) is engaged between each hinge (5) being formed at the lower portion of the triangular flat portion (4), and which a connecting pin (7) having a hole passes through the hinges (5) to be fixed thereby a cotter pin (8) into the hole of said connecting pin (7), and
   a connecting pin (2) having a hole being formed thereon the, housing (1) is engaged through a hole formed at one end of said arm (10) and fixed thereby a cotter pin (11) into a hole of said connecting pin (2).

2. The hitch assembly as defined in claim 1 having a means for mounting a tube section (16) having a reinforcing plate (22) to the plate (24) and to a locking member (21) comprising:
   a threaded bolt (14) with an eye passing through a hole of a bushing (15) and the tube section (16) which is fixed to the plate (24) and to a locking member (21) that is pivotally mounted above a vertical pivot pin (25) having a hole and being formed thereon said plate (24),
   said locking member (21) is locked on the pivot pin (25) thereby a washer (20) and a cotter pin (26) into the hole of said pivot pin (25),
   a tension spring (17) and a block (18) having a hole are mounted thereon the threaded bolt and inside said tube section (16), and
   a nut (19) threaded onto the bolt (14) is tightened against the block (18).

3. The hitch assembly as defined in claim 1 having a means for mounting an attachment cord (46) with a threaded bolt (14) with an eye comprising:

said attachment cord (46) connected with the eye of the threaded bolt (14) turns around a pulley (23) that is fixed into a hole being formed thereon said plate (24) by a threaded bolt (27) and connected thereby a locking nut (28).

4. The hitch assembly as defined in claim 1 having a means for mounting a coupling element of a tractor to said plate (24) comprising:

a recess being formed at one end of said plate (24) to allow to receive the coupling element of the tractor, and a tube section (29) having holes is mounted underneath said plate (24) for receiving a towing hitch of the tractor to be fixed by threaded bolts (30) therein holes and connected by adjustment and locking nuts (31).

5. The hitch assembly as defined in claim 1 having a means for mounting a coupler head (32) to a tow bar (36) of an agricultural implement and to said plate (24) comprising:

a squared plate portion (45) fixed underneath each tow bar (36) of an agricultural implement which are connected at one end of a coupler head (32) by a threaded bolt (34) and locking nut (35), and which at the other end of said coupler head (32) a locking pin (33) passes through vertically aligned holes to allow to be engaged with a recess being formed at one end of said plate (24) and to be locked when a tension spring (17) applies a pressure against a block (18) for automatically closing a locking member (21) thereon the locking pin (33).

6. The hitch assembly as defined in claim 1 having a means for disengaging a locking member (21) from a locking pin (33) in pulling backwards an attachment cord (46).

7. The hitch assembly as defined in claim 1 having a means for mounting spring blades (41)(42)(43) underneath a coupler head (32) comprising:

a tube section (37) having holes which is fixed underneath said coupler head (32) by a threaded bolts (38) and locking nuts (39) for receiving the spring blades (41)(42)(43) which are held together thereby an attachment member (40).

8. The hitch assembly as defined in claim 1 having a means for raising tow bars (36) of the agricultural implement comprising:

a spring blade (43) includes a part member (44) for enabling to apply a pressure against the squared plate portion (45) for raising tow bars (36).

* * * * *